United States Patent
Wang

(10) Patent No.: US 9,749,978 B2
(45) Date of Patent: Aug. 29, 2017

(54) DEVICE-TO-DEVICE D2D COMMUNICATION METHOD AND APPARATUS

(71) Applicant: Huawei Device Co., Ltd., Shenzhen (CN)

(72) Inventor: Jian Wang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/031,912

(22) PCT Filed: Oct. 25, 2013

(86) PCT No.: PCT/CN2013/085970
§ 371 (c)(1),
(2) Date: Apr. 25, 2016

(87) PCT Pub. No.: WO2015/058407
PCT Pub. Date: Apr. 30, 2015

(65) Prior Publication Data
US 2016/0270014 A1    Sep. 15, 2016

(51) Int. Cl.
*H04W 56/00* (2009.01)
*H04W 4/00* (2009.01)
(Continued)

(52) U.S. Cl.
CPC ....... *H04W 56/0015* (2013.01); *H04W 4/005* (2013.01); *H04W 56/00* (2013.01); *H04W 72/0446* (2013.01); *H04W 76/023* (2013.01)

(58) Field of Classification Search
CPC .................. H04W 56/0015; H04W 4/005
See application file for complete search history.

(56) References Cited

U.S. PATENT DOCUMENTS

2012/0122502 A1* 5/2012 Shin .................... H04W 28/048
455/501
2013/0083779 A1   4/2013 Ahn et al.
2014/0269641 A1   9/2014 Jang et al.

FOREIGN PATENT DOCUMENTS

CN    103108389    *  5/2013  ............ H04W 56/00
CN    103108389  A     5/2013
(Continued)

OTHER PUBLICATIONS

Partial English Translation and Abstract of Chinese Patent Application No. CN103108389, Part 1, Apr. 7, 2016, 7 pages.
(Continued)

*Primary Examiner* — Tuan H Nguyen
(74) *Attorney, Agent, or Firm* — Conley Rose, P.C.

(57) ABSTRACT

A device-to-device (D2D) communication method and an apparatus where the method includes acquiring, by a first device, a communication signal resource and timing information of the communication signal resource, where the communication signal resource is used for D2D communication, and receiving, by the first device, on the communication signal resource according to the timing information of the communication signal resource, a communication signal sent by a second device, and using the D2D communication method and the apparatus provided in the present disclosure, synchronization between user devices for D2D communication can be implemented such that users located in different cells can use a D2D proximity service.

20 Claims, 3 Drawing Sheets

(51) Int. Cl.
  *H04W 76/02* (2009.01)
  *H04W 72/04* (2009.01)

(56) References Cited

FOREIGN PATENT DOCUMENTS

| | | |
|---|---|---|
| CN | 103108405 A | 5/2013 |
| CN | 103347246 A | 10/2013 |
| JP | 2001237762 A | 8/2001 |
| JP | 2001308777 A | 11/2001 |
| JP | 2003061152 A | 2/2003 |
| WO | 2008107984 A1 | 9/2008 |
| WO | 2013066126 A1 | 5/2013 |
| WO | 2013100831 A1 | 7/2013 |

OTHER PUBLICATIONS

Partial English Translation and Abstract of Chinese Patent Application No. CN103108389, Part 2, Apr. 7, 2016, 3 pages.

Ericsson, "Synchronization Procedures for D2D Discovery and Communication," R1-134720, 3GPP TSG RAN WG1, Meeting #74bis, Oct. 7-11, 2013, 6 pages.

Foreign Communication From a Counterpart Application, European Application No. 13895831.9, Extended European Search Report dated Sep. 9, 2016, 10 pages.

Foreign Communication From a Counterpart Application, PCT Application No. PCT/CN2013/085970, English Translation of International Search Report dated Jul. 28, 2014, 2 pages.

Foreign Communication From a Counterpart Application, PCT Application No. PCT/CN2013/085970, English Translation of Written Opinion dated Jul. 28, 2014, 20 pages.

Machine Translation and Abstract of Japanese Publication No. JP2001237762, Aug. 31, 2001, 12 pages.

Machine Translation and Abstract of Japanese Publication No. JP2001308777, Nov. 2, 2001, 19 pages.

Machine Translation and Abstract of Japanese Publication No. JP2003061152, Feb. 28, 2003, 16 pages.

Machine Translation and Abstract of European Publication No. WO2008107984, Sep. 12, 2008, 160 pages.

Foreign Communication From A Counterpart Application, Japanese Application No. 2016-519930, Japanese Office Action dated May 30, 2017, 3 pages.

* cited by examiner

DEVICE-TO-DEVICE D2D COMMUNICATION METHOD AND APPARATUS

CROSS-REFERENCE TO RELATED APPLICATION

This application is a U.S. National Stage of International Application No. PCT/CN2013/085970, filed on Oct. 25, 2013, which is hereby incorporated by reference in its entirety.

TECHNICAL FIELD

Embodiments of the present disclosure relate to communications technologies, and in particular, to a device-to-device (D2D) communication method and an apparatus.

BACKGROUND

With rapid development of mobile communications technologies, providing a device-to-device proximity service (D2D ProSe) on a mobile communications network has become a research topic for a long term evolution (LTE) system Rel. 12 of the third generation partnership project (3GPP). A D2D ProSe provided based on a physical layer of an LTE network greatly enriches a service scope of the LTE network. The D2D ProSe includes D2D discovery and D2D direct communication. D2D discovery refers to a process in which a user device recognizes another device in its vicinity using a discovery signal, including sending of the discovery signal and receiving of the discovery signal. D2D direct communication refers to direct communication between two user devices, including such processes as call origination, channel measurement, channel feedback, resource scheduling, data transmission, and call termination.

To implement D2D discovery and D2D direct communication between user devices, time synchronization and frequency synchronization need to be ensured between the user devices. In an existing mobile communications system, when communicating with a serving cell, a user device only needs to know and track a synchronization signal of the serving cell. However, in the D2D ProSe, that two or more user devices located in different cells track only synchronization signals corresponding to their respective serving cells can only ensure synchronization between each user device and its corresponding serving cell, but cannot ensure time synchronization and frequency synchronization between the user devices. Consequently, the D2D ProSe between the user devices cannot be ensured.

SUMMARY

Embodiments of the present disclosure provide a D2D communication method and an apparatus such that users located in different cells can use a device-to-device proximity service.

According to a first aspect, an embodiment of the present disclosure provides a D2D communication method, where the method includes acquiring, by a first device, a communication signal resource and timing information of the communication signal resource, where the communication signal resource is used for D2D communication, and receiving, by the first device, on the communication signal resource according to the timing information of the communication signal resource, a communication signal sent by a second device.

According to the first aspect, in a first possible implementation manner of the first aspect, acquiring, by a first device, timing information of the communication signal resource includes acquiring, by the first device, a timing signal of the communication signal resource, and determining, by the first device, the timing information of the communication signal resource according to the timing signal of the communication signal resource.

According to the first possible implementation manner of the first aspect, in a second possible implementation manner of the first aspect, acquiring, by a first device, a timing signal of the communication signal resource includes acquiring, by the first device, indication information of the timing signal of the communication signal resource, and acquiring, by the first device, the timing signal of the communication signal resource according to the indication information of the timing signal of the communication signal resource.

According to the first aspect, in a third possible implementation manner of the first aspect, acquiring, by a first device, timing information of the communication signal resource includes acquiring, by the first device, indication information of a reference timing signal, and a time deviation of timing of the communication signal resource relative to timing of the reference timing signal, acquiring, by the first device, the reference timing signal according to the indication information of the reference timing signal, determining, by the first device, timing information of the reference timing signal according to the reference timing signal, and acquiring, by the first device, the timing information of the communication signal resource according to the timing information of the reference timing signal and the timing of the reference timing signal is equivalent to the time deviation of the timing of the communication signal resource.

According to the third possible implementation manner of the first aspect, in a fourth possible implementation manner of the first aspect, the reference timing signal is a timing signal of a communication signal resource of the first device.

According to any one of the second to the fourth possible implementation manners of the first aspect, in a fifth possible implementation manner of the first aspect, the indication information of the timing signal is indication information of a primary synchronization signal (PSS), and/or indication information of a secondary synchronization signal (SSS), and/or indication information of a common pilot signal (CRS), and/or indication information of a demodulation reference signal, and/or cell identity information, and/or indication information of a primary D2D synchronization signal (PD2DSS), and/or indication information of a secondary D2D synchronization signal (SD2DSS), and/or indication information of a D2D demodulation reference signal (D2D-DMRS), and/or identification information of a D2D cluster.

According to any one of the first aspect and the first to the fifth possible implementation manners of the first aspect, in a sixth possible implementation manner of the first aspect, the communication signal resource includes a first communication signal resource and a second communication signal resource, and correspondingly, the timing information of the communication signal resource includes timing information of the first communication signal resource and timing information of the second communication signal resource, and receiving, by the first device, on the communication signal resource according to the timing information of the communication signal resource, a communication signal sent by a second device includes receiving, by the first device, the communication signal sent by the second device and sending a communication signal of the first device, on the first communication signal resource according to the timing information of the first communication signal resource, and receiving, on the second communication signal resource according to the timing information of the second communications signal resource, the communication signal sent by the second device.

According to any one of the first aspect and the first to the sixth possible implementation manners of the first aspect, in a seventh possible implementation manner of the first aspect, the D2D communication includes D2D discovery and/or D2D direct communication.

According to a second aspect, an embodiment of the present disclosure provides a D2D communication method, where the method includes acquiring, by a base station, a communication signal resource and timing information of the communication signal resource, where the communication signal resource is used for D2D communication, and sending, by the base station, the communication signal resource and the timing information of the communication signal resource to a first device such that the first device receives, on the communication signal resource according to the timing information of the communication signal resource, a communication signal sent by a second device.

According to the second aspect, in a first possible implementation manner of the second aspect, sending, by the base station, the communication signal resource and the timing information of the communication signal resource to a first device such that the first device receives, on the communication signal resource according to the timing information of the communication signal resource, a communication signal sent by a second device includes sending, by the base station, the communication signal resource and a timing signal of the communication signal resource to the first device such that the first device determines the timing information of the communication signal resource according to the timing signal of the communication signal resource, and receives, on the communication signal resource according to the timing information of the communication signal resource, the communication signal sent by the second device.

According to the first possible implementation manner of the second aspect, in a second possible implementation manner of the second aspect, sending, by the base station, a timing signal of the communication signal resource to the first device such that the first device determines the timing information of the communication signal resource according to the timing signal of the communication signal resource includes sending, by the base station, indication information of the timing signal of the communication signal resource to the first device such that the first device acquires the timing signal of the communication signal resource according to the indication information of the timing signal of the communication signal resource, and determines the timing information of the communication signal resource according to the timing signal of the communication signal resource.

According to the second aspect, in a third possible implementation manner of the second aspect, sending, by the base station, the communication signal resource and the timing information of the communication signal resource to a first device such that the first device receives, on the communication signal resource according to the timing information of the communication signal resource, a communication signal sent by a second device includes sending, by the base station to the first device, indication information of a reference timing signal, the communication signal resource, and a time deviation of timing of the communication signal resource relative to timing of the reference timing signal such that the first device acquires the timing information of the communication signal resource according to the indication information of the reference timing signal and the time deviation of the timing of the communication signal resource relative to the timing of the reference timing signal, and receives, on the communication signal resource using the timing information of the communication signal resource, the communication signal sent by the second device.

According to the third possible implementation manner of the second aspect, in a fourth possible implementation manner of the second aspect, the reference timing signal is a timing signal of a communication signal resource of the first device.

According to any one of the second to the fourth possible implementation manners of the second aspect, in a fifth possible implementation manner of the second aspect, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a, and/or identification information of a D2D cluster.

According to any one of the second aspect and the first to the fifth possible implementation manners of the second aspect, in a sixth possible implementation manner of the second aspect, the communication signal resource includes a first communication signal resource and a second communication signal resource, and correspondingly, the timing information of the communication signal resource includes timing information of the first communication signal resource and timing information of the second communication signal resource, and sending, by the base station, the communication signal resource and the timing information of the communication signal resource to a first device such that the first device receives, on the communication signal resource according to the timing information of the communication signal resource, a communication signal sent by a second device includes sending, by the base station to the first device, the first communication signal resource, the second communication signal resource, the timing information of the first communication signal resource, and the timing information of the second communication signal resource such that the first device receives the communication signal sent by the second device and sends a communication signal of the first device, on the first communication signal resource according to the timing information of the first communication signal resource, and such that the first device receives, on the second communication signal resource according to the timing information of the second communication signal resource, the communication signal sent by the second device.

According to any one of the second aspect and the first to the sixth possible implementation manners of the second aspect, in a seventh possible implementation manner of the second aspect, the D2D communication includes D2D discovery and/or D2D direct communication.

According to a third aspect, an embodiment of the present disclosure provides a first device, where the first device includes an acquiring module configured to acquire a communication signal resource and timing information of the communication signal resource, where the communication signal resource is used for D2D communication, and a transceiver module configured to receive, on the communication signal resource according to the timing information of the communication signal resource acquired by the acquiring module, a communication signal sent by a second device.

According to the third aspect, in a first possible implementation manner of the third aspect, the acquiring module is further configured to acquire a timing signal of the communication signal resource, and determine the timing information of the communication signal resource according to the timing signal of the communication signal resource.

According to the first possible implementation manner of the third aspect, in a second possible implementation manner of the third aspect, the acquiring module is further configured to acquire indication information of the timing signal of the communication signal resource, and acquire the timing signal of the communication signal resource according to the indication information of the timing signal of the communication signal resource.

According to the third aspect, in a third possible implementation manner of the third aspect, the acquiring module is further configured to acquire indication information of a reference timing signal, and a time deviation of timing of the communication signal resource relative to timing of the reference timing signal, acquire the reference timing signal according to the indication information of the reference timing signal, determine timing information of the reference timing signal according to the reference timing signal, and acquire the timing information of the communication signal resource according to the timing information of the reference timing signal and the timing of the reference timing signal is equivalent to the time deviation of the timing of the communication signal resource.

According to the third possible implementation manner of the third aspect, in a fourth possible implementation manner of the third aspect, the reference timing signal is a timing signal of a communication signal resource of the first device.

According to any one of the second to the fourth possible implementation manners of the third aspect, in a fifth possible implementation manner of the third aspect, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

According to any one of the third aspect and the first to the fifth possible implementation manners of the third aspect, in a sixth possible implementation manner of the third aspect, the communication signal resource includes a first communication signal resource and a second communication signal resource, and correspondingly, the timing information of the communication signal resource includes timing information of the first communication signal resource and timing information of the second communication signal resource, and the transceiver module is further configured to receive the communication signal sent by the second device and send a communication signal of the first device, on the first communication signal resource according to the timing information of the first communication signal resource, and receive, on the second communication signal resource according to the timing information of the second communications signal resource, the communication signal sent by the second device.

According to any one of the third aspect and the first to the sixth possible implementation manners of the third aspect, in a seventh possible implementation manner of the third aspect, the D2D communication includes D2D discovery and/or D2D direct communication.

According to a fourth aspect, an embodiment of the present disclosure provides a base station, where the base station includes an acquiring module configured to acquire a communication signal resource and timing information of the communication signal resource, where the communication signal resource is used for D2D communication, and a sending module configured to send, to a first device, the communication signal resource and the timing information of the communication signal resource that are acquired by the acquiring module such that the first device receives, on the communication signal resource according to the timing information of the communication signal resource, a communication signal sent by a second device.

According to the fourth aspect, in a first possible implementation manner of the fourth aspect, the sending module is further configured to send the communication signal resource and a timing signal of the communication signal resource to the first device such that the first device determines the timing information of the communication signal resource according to the timing signal of the communication signal resource, and receives, on the communication signal resource according to the timing information of the communication signal resource, the communication signal sent by the second device.

According to the first possible implementation manner of the fourth aspect, in a second possible implementation manner of the fourth aspect, the sending module is further configured to send indication information of the timing signal of the communication signal resource to the first device such that the first device acquires the timing signal of the communication signal resource according to the indication information of the timing signal of the communication signal resource, and determines the timing information of the communication signal resource according to the timing signal of the communication signal resource.

According to the first possible implementation manner of the fourth aspect, in a third possible implementation manner of the fourth aspect, the sending module is further configured to send, to the first device, indication information of a reference timing signal, the communication signal resource, and a time deviation of timing of the communication signal resource relative to timing of the reference timing signal such that the first device acquires the timing information of the communication signal resource according to the indication information of the reference timing signal and the time deviation of the timing of the communication signal resource relative to the timing of the reference timing signal, and receives, on the communication signal resource using the timing information of the communication signal resource, the communication signal sent by the second device.

According to the third possible implementation manner of the fourth aspect, in a fourth possible implementation manner of the fourth aspect, the reference timing signal is a timing signal of a communication signal resource of the first device.

According to any one of the second to the fourth possible implementation manners of the fourth aspect, in a fifth possible implementation manner of the fourth aspect, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

According to any one of the fourth aspect and the first to the fifth possible implementation manners of the fourth aspect, in a sixth possible implementation manner of the fourth aspect, the communication signal resource includes a first communication signal resource and a second communication signal resource, and correspondingly, the timing information of the communication signal resource includes timing information of the first communication signal resource and timing information of the second communication signal resource, and the sending module is further configured to send, to the first device, the first communication signal resource, the second communication signal resource, the timing information of the first communication signal resource, and the timing information of the second communication signal resource such that the first device receives the communication signal sent by the second device and sends a communication signal of the first device, on the first communication signal resource according to the timing information of the first communication signal resource, and so that the first device receives, on the second communication signal resource according to the timing information of the second communication signal resource, the communication signal sent by the second device.

According to any one of the fourth aspect and the first to the sixth possible implementation manners of the fourth aspect, in a seventh possible implementation manner of the fourth aspect, the D2D communication includes D2D discovery and/or D2D direct communication.

According to a fifth aspect, an embodiment of the present disclosure provides a first device, where the first device includes a processor and a memory, where the memory stores an executable instruction, and when the first device runs, the processor communicates with the memory, and the processor executes the executable instruction, causing the first device to execute the D2D communication method provided in any embodiment of the present disclosure.

According to a sixth aspect, an embodiment of the present disclosure provides a base station, where the base station includes a processor and a memory, where the memory stores an executable instruction, and when the base station runs, the processor communicates with the memory, and the processor executes the executable instruction, causing the base station to execute the D2D communication method provided in any embodiment of the present disclosure.

Using the D2D communication method and the apparatus provided in the embodiments of the present disclosure, a communication signal resource used for D2D communication and timing information of the communication signal resource are acquired, and a communication signal sent by a second device is received on the communication signal resource according to the timing information of the communication signal resource. This implements synchronization (time synchronization and frequency synchronization) between user devices such that users located in different cells can use a D2D proximity service.

DESCRIPTION OF EMBODIMENTS

Technologies described in this specification can be applied to various communications systems, for example, current second generation (2G) and 3G communications systems and a next-generation communications system, for example, a global system for mobile communications (GSM), a code division multiple access (CDMA) system, a time division multiple access (TDMA) system, wideband code division multiple access (WCDMA), a frequency division multiple access (FDMA) system, an orthogonal frequency-division multiple access (OFDMA) system, a single-carrier FDMA (SC-FDMA) system, a general packet radio service (GPRS) system, a LTE system, and other communications systems.

A user device involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the RAN. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A network device involved in this application may be, for example, a base station or a radio network controller (RNC).

The base station (for example, an access point) may be a base station (base transceiver station (BTS)) in GSM or CDMA, may be a base station (NodeB) in WCDMA, may be an evolved NodeB (e-NodeB) in LTE, or may be a cluster head of a user cluster in D2D communication, which is not limited in this application.

Figure 1:
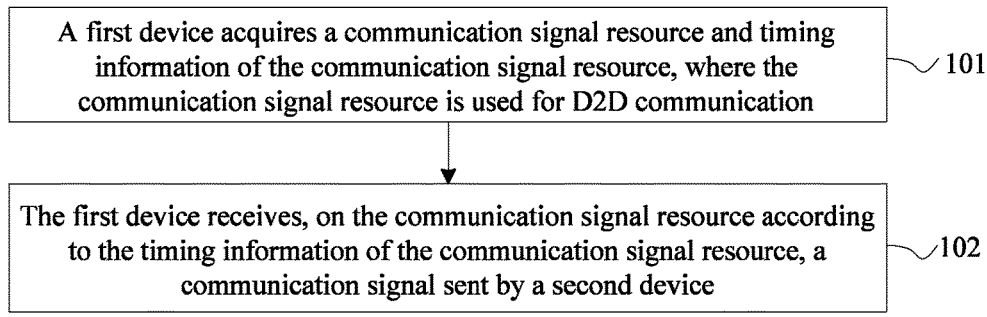
FIG. 1 is a flowchart of a D2D communication method according to an embodiment of the present disclosure.

FIG. 1 is a flowchart of a D2D communication method according to an embodiment of the present disclosure. As shown in FIG. 1, the method of this embodiment includes the following steps.

Step 101: A first device acquires a communication signal resource and timing information of the communication signal resource, where the communication signal resource is used for D2D communication.

Step 102: The first device receives, on the communication signal resource according to the timing information of the communication signal resource, a communication signal sent by a second device.

The first device and the second device may be user devices that are located in different cells or different clusters, or may be different user devices that are located in a same cell or a same cluster. The D2D communication is a D2D ProSe. The communication signal resource is used for D2D communication between user devices. In practice, the communication signal resource may be differentiated using an identifier of the communication signal resource.

Using the D2D communication method provided in this embodiment of the present disclosure, a communication signal resource used for D2D communication and timing information of the communication signal resource are acquired, and a communication signal sent by a second device is received on the communication signal resource according to the timing information of the communication signal resource. This implements synchronization (time synchronization and frequency synchronization) between user devices for D2D communication such that users located in different cells or users in a same cell but with different timing references can use a D2D proximity service.

On the basis of the foregoing embodiment, the D2D communication includes D2D discovery and/or D2D direct communication. In practice, a serving cell of the first device is a first cell, and a serving cell of the second device is a second cell. The first cell and the second cell may be a same cell, different cells of a same base station, or cells of different base stations. It should be understood that there may be one or more second devices, and there may be at least one second cell.

A base station (a first base station) to which the first cell belongs acquires, from a neighboring base station using a communications interface (for example, an X2 interface between two e-NodeBs), a communication signal resource allocated to a respective user served by each cell (including at least the second cell) controlled by the neighboring base station, and acquires, in combination with a communication signal resource allocated to a respective user served by each cell (including at least the first cell) controlled by the base station to which the first cell belongs, information about the communication signal resource. The communication signal resource includes at least a communication signal resource that a serving cell (the second cell) of the second device allocates to a user served by the second cell (referred to as a communication signal resource of the second device). The first device acquires the information about the communication signal resource from the first base station, and receives, on the communication signal resource according to the information about the communication signal resource, the communication signal sent by the second device.

Optionally, according to a resource allocation policy in practice, the communication signal resource may include a first communication signal resource and a second communication signal resource. Correspondingly, the timing information of the communication signal resource may include timing information of the first communication signal resource and timing information of the second communication signal resource. The timing information of the first communication signal resource and the timing information of the second communication signal resource may be the same timing information, or may be different timing information. According to the timing information of the first communication signal resource, the first device may receive, on the first communication signal resource, the communication signal sent by the second device, and may also send a communication signal of the first device on the first communication signal resource. However, the first device may only receive, on the second communication signal resource according to the timing information of the second communications signal resource, the communication signal sent by the second device. The first communication signal resource may be a resource group, for example, may include resources a, b, c, and d. The first device may receive the communication signal of the second device on the resource a, and send the communication signal of the first device on the resource c. The resource a and the resource c are different resources, but both belong to the first communication signal resource. In this embodiment, the communication signal resource is classified into the first communication signal resource that supports both receiving and sending and the second communication signal resource that supports only receiving. This implements flexible configuration of resources required for receiving and sending signals in a D2D communication process.

In a feasible implementation manner, on the basis of the foregoing embodiment, the second devices may share a same communication signal resource. In this case, timing varies when the second devices perform D2D communication using the same communication signal resource.

On the basis of the foregoing embodiment, the first device acquires the information about the communication signal resource in at least two implementation manners.

Manner 1: The first device acquires a timing signal of the communication signal resource, and determines timing information of the communication signal resource according to the timing signal of the communication signal resource. An implementation method for the first device to acquire the timing signal of the communication signal resource may be as follows. The first device acquires indication information of the timing signal of the communication signal resource, and acquires the timing signal of the communication signal resource according to the indication information of the timing signal of the communication signal resource.

Manner 2: The first device acquires indication information of a reference timing signal, and a time deviation of timing of the communication signal resource relative to timing of the reference timing signal, acquires the reference timing signal according to the indication information of the reference timing signal, determines timing information of the reference timing signal according to the reference timing signal, and acquires timing information of the communication signal resource according to the timing information of the reference timing signal and the timing of the reference timing signal is equivalent to the time deviation of the timing of the communication signal resource.

Furthermore, the first device acquires, from the first base station, the indication information of the reference timing signal and the time deviation of the timing of the communication signal resource relative to the timing of the reference timing signal, acquires the reference timing signal according to the indication information of the reference timing signal, and then determines the timing information of the reference timing signal, and further, acquires the timing information of the communication signal resource according to the timing information of the reference timing signal and the timing of the reference timing signal is equivalent to the time deviation of the timing of the communication signal resource.

The reference timing signal is a common timing reference source, and may provide reference timing for communication signal resources of multiple cells. Optionally, the reference timing signal may be an independent timing reference source, timing information of a communication signal resource of the first device (that is, timing information of a communication signal resource allocated by the first cell to a user that is served by the first cell), timing information of a communication signal resource of the second device, or timing information of a communication signal resource of another cell (that is, a cell except the first cell and the second cell).

In practice, the indication information of the timing signal may be indication information of a PSS, and/or indication information of an SSS, and/or indication information of a CRS for short), and/or indication information of a demodulation reference signal, and/or cell identity information, and/or indication information of a PD2DSS, and/or indication information of a SD2DSS, and/or indication information of a D2D-DMRS, and/or identification information of a D2D cluster.

Figure 2:
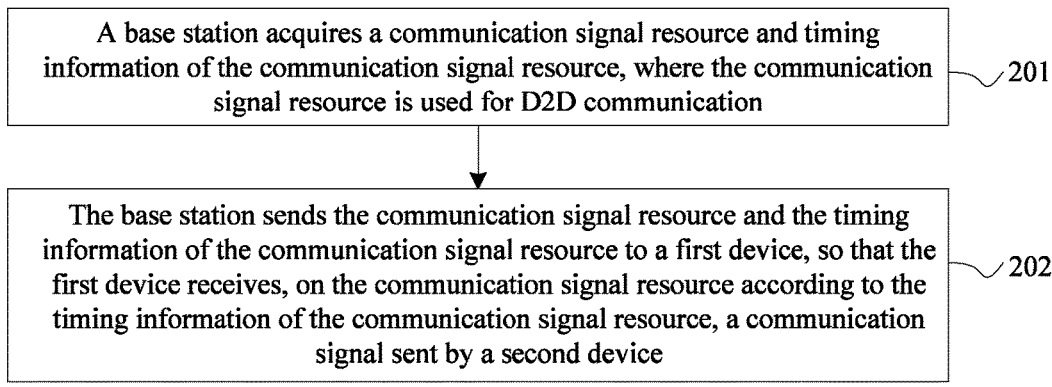
FIG. 2 is another flowchart of a D2D communication method according to an embodiment of the present disclosure.

FIG. 2 is another flowchart of a D2D communication method according to an embodiment of the present disclosure. As shown in FIG. 2, the method of this embodiment includes the following steps.

Step 201: A base station acquires a communication signal resource and timing information of the communication signal resource, where the communication signal resource is used for D2D communication.

Step 202: The base station sends the communication signal resource and the timing information of the communication signal resource to a first device such that the first device receives, on the communication signal resource according to the timing information of the communication signal resource, a communication signal sent by a second device.

Furthermore, the base station is a base station to which a serving cell of the first device belongs. The base station acquires the communication signal resource used for D2D communication and the timing information of the communication signal resource, and sends the communication signal resource and the timing information of the communication signal resource to the first device. The first device receives, on the communication signal resource according to the timing information of the communication signal resource, the communication signal sent by the second device.

Using the D2D communication method provided in this embodiment of the present disclosure, a communication signal resource used for D2D communication and timing information of the communication signal resource are acquired and provided to a first device such that the first device receives, on the communication signal resource according to the timing information of the communication signal resource, a communication signal sent by a second device. This implements synchronization for D2D communication between user devices such that users located in different cells can use a D2D proximity service.

Figure 3:
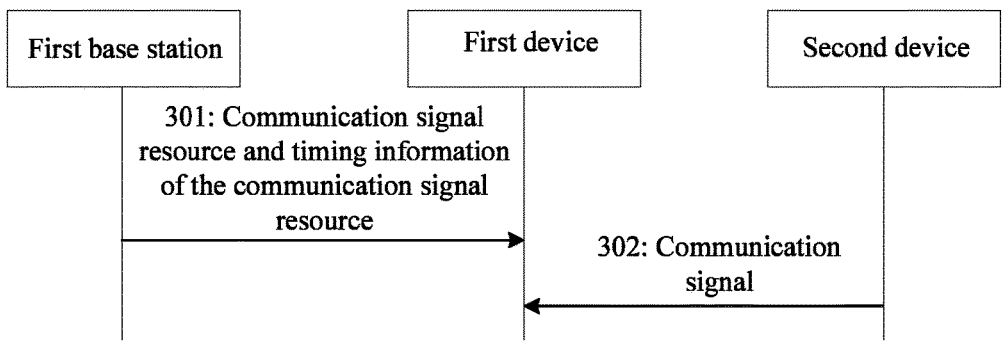
FIG. 3 is a signaling flowchart of a D2D communication method according to an embodiment of the present disclosure.

FIG. 3 is a signaling flowchart of a D2D communication method according to an embodiment of the present disclosure. The method is executed by a first device, a second device, and a first base station collaboratively, and the first base station is a base station to which a serving cell (a first cell) of the first device belongs. As shown in FIG. 3, the method includes the following steps.

Step 301: A first base station sends, to the first device, a communication signal resource and timing information of the communication signal resource, where the communication signal resource is allocated by each cell controlled by a base station to a respective user served by the cell, to perform D2D communication.

Step 302: The first device receives, on the communication signal resource using the timing information of the communication signal resource, a communication signal sent by a second device.

Figure 4:
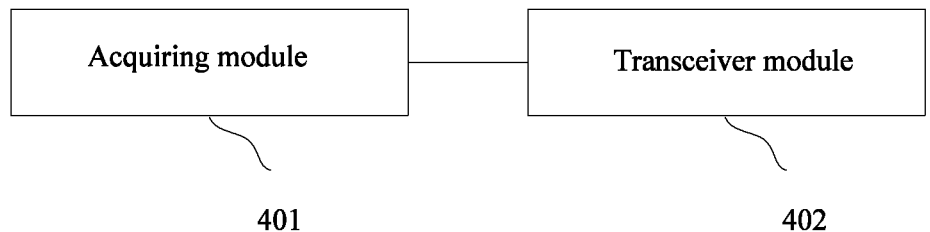
FIG. 4 is a schematic diagram of a structure of a first device according to an embodiment of the present disclosure.

FIG. 4 is a schematic diagram of a structure of a first device according to an embodiment of the present disclosure. As shown in FIG. 4, a first device 400 provided in this embodiment includes an acquiring module 401 and a transceiver module 402.

The acquiring module 401 is configured to acquire a communication signal resource and timing information of the communication signal resource, where the communication signal resource is used for D2D communication.

The transceiver module 402 is configured to receive, on the communication signal resource according to the timing information of the communication signal resource acquired by the acquiring module 401, a communication signal sent by a second device.

The first device 400 provided in this embodiment of the present disclosure may be used to execute the technical solution of the method embodiment shown in FIG. 1. Implementation principles and technical effects thereof are similar, and details are not repeatedly described herein.

In an implementation manner, the acquiring module 401 is further configured to acquire a timing signal of the communication signal resource, and determine the timing information of the communication signal resource according to the timing signal of the communication signal resource.

The acquiring module 401 is further configured to acquire indication information of the timing signal of the communication signal resource, and acquire the timing signal of the communication signal resource according to the indication information of the timing signal of the communication signal resource.

In another implementation manner, the acquiring module 401 is further configured to acquire indication information of a reference timing signal, and a time deviation of timing of the communication signal resource relative to timing of the reference timing signal, acquire the reference timing signal according to the indication information of the reference timing signal, determine timing information of the reference timing signal according to the reference timing signal, and acquire the timing information of the communication signal resource according to the timing information of the reference timing signal and the timing of the reference timing signal is equivalent to the time deviation of the timing of the communication signal resource. Optionally, the reference timing signal is a timing signal of a communication signal resource of the first device.

Further, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

Optionally, the communication signal resource includes a first communication signal resource and a second communication signal resource, and correspondingly, the timing information of the communication signal resource includes timing information of the first communication signal resource and timing information of the second communication signal resource, and the transceiver module 402 is further configured to receive the communication signal sent by the second device and send a communication signal of the first device, on the first communication signal resource according to the timing information of the first communication signal resource, and receive, on the second communication signal resource according to the timing information of the second communications signal resource, the communication signal sent by the second device.

Optionally, the D2D communication includes D2D discovery and/or D2D direct communication.

Figure 5:
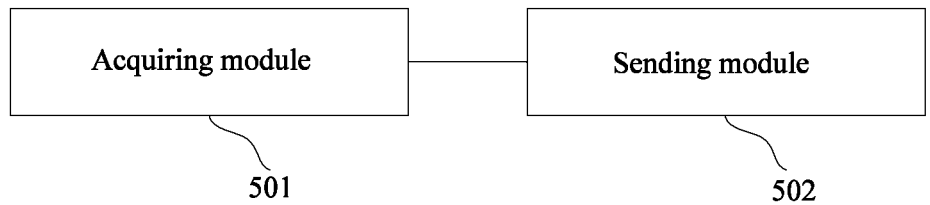
FIG. 5 is a schematic diagram of a structure of a base station according to an embodiment of the present disclosure.

FIG. 5 is a schematic diagram of a structure of a base station according to an embodiment of the present disclosure. As shown in FIG. 5, a base station 500 provided in this embodiment includes an acquiring module 501 and a sending module 502.

The acquiring module 501 is configured to acquire a communication signal resource and timing information of the communication signal resource, where the communication signal resource is used for D2D communication.

The sending module 502 is configured to send, to a first device, the communication signal resource and the timing information of the communication signal resource that are acquired by the acquiring module 501 such that the first device receives, on the communication signal resource according to the timing information of the communication signal resource, a communication signal sent by a second device.

The base station 500 provided in this embodiment of the present disclosure may be used to execute the technical solution of the method embodiment shown in FIG. 2. Implementation principles and technical effects thereof are similar, and details are not repeatedly described herein.

In an implementation manner, the sending module 502 is further configured to send the communication signal resource and a timing signal of the communication signal resource to the first device such that the first device determines the timing information of the communication signal resource according to the timing signal of the communication signal resource, and receives, on the communication signal resource according to the timing information of the communication signal resource, the communication signal sent by the second device.

The sending module 502 is further configured to send indication information of the timing signal of the communication signal resource to the first device such that the first device acquires the timing signal of the communication signal resource according to the indication information of the timing signal of the communication signal resource, and determines the timing information of the communication signal resource according to the timing signal of the communication signal resource.

In another implementation manner, the sending module 502 is further configured to send, to the first device, indication information of a reference timing signal, the communication signal resource, and a time deviation of timing of the communication signal resource relative to timing of the reference timing signal such that the first device acquires the timing information of the communication signal resource according to the indication information of the reference timing signal and the time deviation of the timing of the communication signal resource relative to the timing of the reference timing signal, and receives, on the communication signal resource using the timing information of the communication signal resource, the communication signal sent by the second device. Optionally, the reference timing signal is a timing signal of a communication signal resource of the first device.

Further, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

Optionally, the communication signal resource includes a first communication signal resource and a second communication signal resource, and correspondingly, the timing information of the communication signal resource includes timing information of the first communication signal resource and timing information of the second communication signal resource, and the sending module 502 is further configured to send, to the first device, the first communication signal resource, the second communication signal resource, the timing information of the first communication signal resource, and the timing information of the second communication signal resource such that the first device receives the communication signal sent by the second device and sends a communication signal of the first device, on the first communication signal resource according to the timing information of the first communication signal resource, and so that the first device receives, on the second communication signal resource according to the timing information of the second communication signal resource, the communication signal sent by the second device.

Optionally, the D2D communication includes D2D discovery and/or D2D direct communication.

Figure 6:
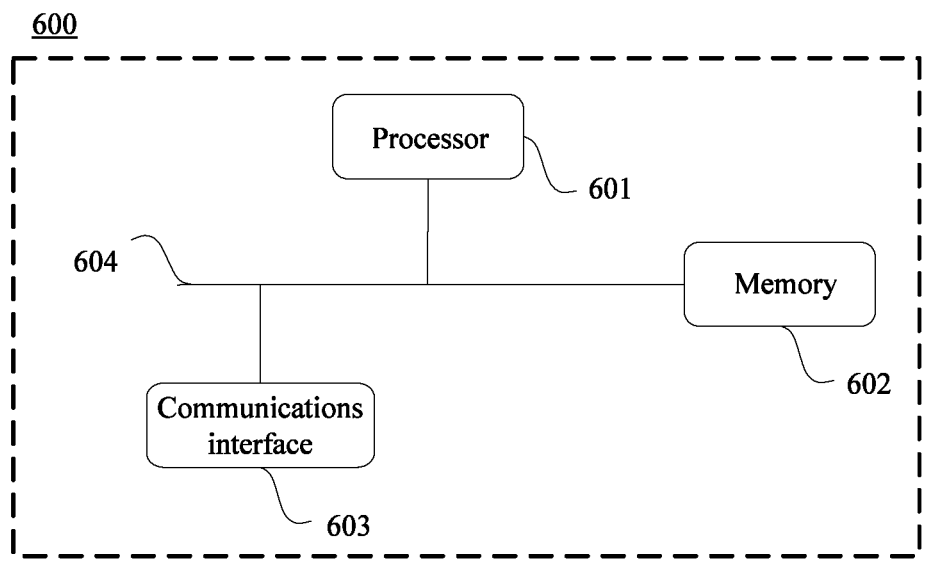
FIG. 6 is another schematic diagram of a structure of a first device according to an embodiment of the present disclosure.

FIG. 6 is another schematic diagram of a structure of a first device according to an embodiment of the present disclosure. As shown in FIG. 6, a first device 600 provided in this embodiment of the present disclosure includes a processor 601, a memory 602, and a communications interface 603, and further includes a communications bus 604. The processor 601, the memory 602, and the communications interface 603 are connected to each other using the communications bus 604.

The processor 601 may be a general-purpose processor, including a central processing unit (CPU), a network processor (NP), and the like, or may be a digital signal processor (DSP), an application-specific integrated circuit (ASIC), a field programmable gate array (FPGA) or another programmable logic device, or a discrete hardware component.

The memory 602 is configured to store a program. The program may include program code, and the program code includes a computer operation instruction. The memory 602 may include a high-speed random-access memory (RAM), and may further include a non-volatile memory, for example, at least one disk memory.

The communications interface 603 is configured for communication between the first device 600 and another device, where a data packet may be received or sent using the communications interface.

When the first device 600 runs, the processor 601 communicates with the memory 602, and the processor 601 executes the program stored in the memory 602, and executes the D2D communication method provided in this embodiment of the present disclosure. The method includes acquiring a communication signal resource and timing information of the communication signal resource, where the communication signal resource is used for D2D communication, and receiving, on the communication signal resource according to the timing information of the communication signal resource, a communication signal sent by a second device.

In an implementation manner, the acquiring timing information of the communication signal resource includes acquiring a timing signal of the communication signal resource, and determining the timing information of the communication signal resource according to the timing signal of the communication signal resource.

Further, the acquiring a timing signal of the communication signal resource includes acquiring indication information of the timing signal of the communication signal resource, and acquiring the timing signal of the communication signal resource according to the indication information of the timing signal of the communication signal resource.

In another implementation manner, the acquiring timing information of the communication signal resource includes acquiring indication information of a reference timing signal, and a time deviation of timing of the communication signal resource relative to timing of the reference timing signal, acquiring the reference timing signal according to the indication information of the reference timing signal, determining timing information of the reference timing signal according to the reference timing signal, and acquiring the timing information of the communication signal resource according to the timing information of the reference timing signal and the timing of the reference timing signal is equivalent to the time deviation of the timing of the communication signal resource. Optionally, the reference timing signal is a timing signal of a communication signal resource of the first device.

Further, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

Optionally, the communication signal resource includes a first communication signal resource and a second communication signal resource, and correspondingly, the timing information of the communication signal resource includes timing information of the first communication signal resource and timing information of the second communication signal resource, and receiving, on the communication signal resource according to the timing information of the communication signal resource, a communication signal sent by a second device includes receiving the communication signal sent by the second device and sending a communication signal of the first device, on the first communication signal resource according to the timing information of the first communication signal resource, and receiving, on the second communication signal resource according to the timing information of the second communications signal resource, the communication signal sent by the second device.

Optionally, the D2D communication includes D2D discovery and/or D2D direct communication.

Figure 7:
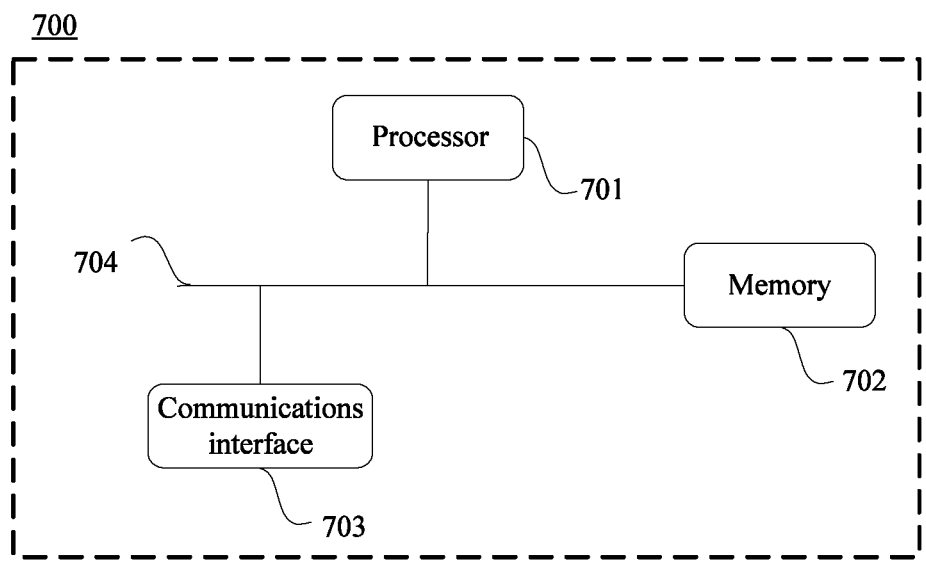
FIG. 7 is another schematic diagram of a structure of a base station according to an embodiment of the present disclosure.

FIG. 7 is another schematic diagram of a structure of a base station according to an embodiment of the present disclosure. As shown in FIG. 7, a base station 700 provided in this embodiment of the present disclosure includes a processor 701, a memory 702, and a communications interface 703, and further includes a communications bus 704.

The processor 701, the memory 702, and the communications interface 703 are connected to each other using the communications bus 704.

The processor 701 may be a general-purpose processor, including a CPU, a NP, and the like, or may be a DSP, an ASIC, a FPGA or another programmable logic device, or a discrete hardware component.

The memory 702 is configured to store a program. The program may include program code, and the program code includes a computer operation instruction. The memory 702 may include a high-speed RAM, and may further include a non-volatile memory, for example, at least one disk memory.

The communications interface 703 is configured for communication between the base station 700 and another device, where a data packet may be received or sent using the communications interface.

When the base station 700 runs, the processor 701 communicates with the memory 702, and the processor 701 executes the program stored in the memory 702, and executes the D2D communication method provided in this embodiment of the present disclosure. The method includes acquiring a communication signal resource and timing information of the communication signal resource, where the communication signal resource is used for D2D communication, sending the communication signal resource and the timing information of the communication signal resource to a first device such that the first device receives, on the communication signal resource according to the timing information of the communication signal resource, a communication signal sent by a second device.

In an implementation manner, sending the communication signal resource and the timing information of the communication signal resource to a first device such that the first device receives, on the communication signal resource according to the timing information of the communication signal resource, a communication signal sent by a second device includes sending the communication signal resource and a timing signal of the communication signal resource to the first device such that the first device determines the timing information of the communication signal resource according to the timing signal of the communication signal resource, and receives, on the communication signal resource according to the timing information of the communication signal resource, the communication signal sent by the second device.

Further, sending a timing signal of the communication signal resource to the first device such that the first device determines the timing information of the communication signal resource according to the timing signal of the communication signal resource includes sending indication information of the timing signal of the communication signal resource to the first device such that the first device acquires the timing signal of the communication signal resource according to the indication information of the timing signal of the communication signal resource, and determines the timing information of the communication signal resource according to the timing signal of the communication signal resource.

In another implementation manner, sending the communication signal resource and the timing information of the communication signal resource to a first device such that the first device receives, on the communication signal resource according to the timing information of the communication signal resource, a communication signal sent by a second device includes sending, to the first device, indication information of a reference timing signal, the communication signal resource, and a time deviation of timing of the communication signal resource relative to timing of the reference timing signal such that the first device acquires the timing information of the communication signal resource according to the indication information of the reference timing signal and the time deviation of the timing of the communication signal resource relative to the timing of the reference timing signal, and receives, on the communication signal resource using the timing information of the communication signal resource, the communication signal sent by the second device. Optionally, the reference timing signal is a timing signal of a communication signal resource of the first device.

Further, the indication information of the timing signal is indication information of a PSS, and/or indication information of an SSS, and/or indication information of a CRS, and/or indication information of a demodulation reference signal, and/or cell identity information, and/or indication information of a PD2DSS, and/or indication information of an SD2DSS, and/or indication information of a D2D-DMRS, and/or identification information of a D2D cluster.

Optionally, the communication signal resource includes a first communication signal resource and a second communication signal resource, and correspondingly, the timing information of the communication signal resource includes timing information of the first communication signal resource and timing information of the second communication signal resource, and sending the communication signal resource and the timing information of the communication signal resource to a first device such that the first device receives, on the communication signal resource according to the timing information of the communication signal resource, a communication signal sent by a second device includes sending, to the first device, the first communication signal resource, the second communication signal resource, the timing information of the first communication signal resource, and the timing information of the second communication signal resource such that the first device receives the communication signal sent by the second device and sends a communication signal of the first device, on the first communication signal resource according to the timing information of the first communication signal resource, and so that the first device receives, on the second communication signal resource according to the timing information of the second communication signal resource, the communication signal sent by the second device.

Optionally, the D2D communication includes D2D discovery and/or D2D direct communication.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A device-to-device (D2D) communication method, comprising:
   acquiring, by a first device served by a first cell of a communication system, a communication signal resource, timing information of the communication signal resource, and a time deviation of timing of the communication resource relative to timing of a reference timing signal, wherein the communication signal resource is used for D2D communication, and wherein the time deviation implements time synchronization and frequency synchronization between user devices for D2D communication such that users at different cells are able to use the D2D communication; and
   receiving, by the first device, on the communication signal resource according to the timing information of the communication signal resource, a communication signal sent by a second device served by a second cell of the communication system.

2. The method according to claim 1, wherein acquiring, by the first device, the timing information of the communication signal resource comprises:
   acquiring, by the first device, a timing signal of the communication signal resource; and
   determining, by the first device, the timing information of the communication signal resource according to the timing signal of the communication signal resource.

3. The method according to claim 2, wherein acquiring, by the first device, the timing signal of the communication signal resource comprises:
   acquiring, by the first device, indication information of the timing signal of the communication signal resource; and
   acquiring, by the first device, the timing signal of the communication signal resource according to the indication information of the timing signal of the communication signal resource.

4. The method according to claim 3, wherein the indication information of the timing signal comprises at least one of:
   indication information of a primary synchronization signal (PSS);
   indication information of a secondary synchronization signal (SSS);
   indication information of a common reference signal (CRS);
   indication information of a demodulation reference signal and/or cell identity information;
   indication information of a primary D2D synchronization signal (PD2DSS);
   indication information of a secondary D2D synchronization signal (SD2DSS);
   indication information of a D2D demodulation reference signal (D2D-DMRS); and
   identification information of a D2D cluster.

5. The method according to claim 1, wherein acquiring, by the first device, the timing information of the communication signal resource comprises:
   acquiring, by the first device, indication information of the reference timing signal, and the time deviation of timing of the communication signal resource relative to timing of the reference timing signal;
   acquiring, by the first device, the reference timing signal according to the indication information of the reference timing signal;

determining, by the first device, timing information of the reference timing signal according to the reference timing signal; and acquiring, by the first device, the timing information of the communication signal resource according to the timing information of the reference timing signal and the time deviation of the timing of the communication signal resource relative to the timing of the reference timing signal.

6. The method according to claim 5, wherein the reference timing signal is a timing signal of the communication signal resource of the first device.

7. The method according to claim 1, wherein the communication signal resource comprises a first communication signal resource and a second communication signal resource, wherein the timing information of the communication signal resource comprises timing information of the first communication signal resource and timing information of the second communication signal resource, and wherein receiving, by the first device, on the communication signal resource according to the timing information of the communication signal resource, the communication signal sent by the second device comprises:

receiving, by the first device, the communication signal sent by the second device;

sending a communication signal of the first device, on the first communication signal resource according to the timing information of the first communication signal resource; and receiving, on the second communication signal resource according to the timing information of the second communications signal resource, the communication signal sent by the second device.

8. The method according to claim 1, wherein the D2D communication comprises at least one of D2D discovery and D2D direct communication, wherein the first device is served by only one of the first cell and the second cell, wherein the second device is served by only one of the first cell and the second cell, and wherein a same cell of the first cell and the second cell does not simultaneously serve the first device and the second device.

9. A device-to-device (D2D) communication method, comprising:

acquiring, by a base station, a communication signal resource, timing information of the communication signal resource, and a time deviation of timing of the communication resource relative to timing of a reference timing signal, wherein the communication signal resource is used for D2D communication, and wherein the time deviation implements time synchronization and frequency synchronization between user devices D2D communication such that users at different cells are able to use the D2D communication; and sending, by the base station, the communication signal resource and the timing information of the communication signal resource to a first device served by the base station such that the first device receives, on the communication signal resource according to the timing information of the communication signal resource, a communication signal sent by a second device served by a second base station.

10. The method according to claim 9, wherein sending, by the base station, the communication signal resource and the timing information of the communication signal resource to the first device such that the first device receives, on the communication signal resource according to the timing information of the communication signal resource, the communication signal sent by the second device comprises sending, by the base station, the communication signal resource and a timing signal of the communication signal resource to the first device such that the first device determines the timing information of the communication signal resource according to the timing signal of the communication signal resource, and receives, on the communication signal resource according to the timing information of the communication signal resource, the communication signal sent by the second device.

11. The method according to claim 10, wherein sending, by the base station, the timing signal of the communication signal resource to the first device such that the first device determines the timing information of the communication signal resource according to the timing signal of the communication signal resource comprises sending, by the base station, indication information of the timing signal of the communication signal resource to the first device such that the first device acquires the timing signal of the communication signal resource according to the indication information of the timing signal of the communication signal resource, and determines the timing information of the communication signal resource according to the timing signal of the communication signal resource.

12. The method according to claim 11, wherein the indication information of the timing signal comprises at least one of:

indication information of a primary synchronization signal (PSS);

indication information of a secondary synchronization signal (SSS);

indication information of a common reference signal (CRS);

indication information of a demodulation reference signal and/or cell identity information;

indication information of a primary D2D synchronization signal (PD2SS);

indication information of a secondary D2D synchronization signal (SD2DSS);

indication information of a D2D demodulation reference signal (D2D-DMRS); and identification information of a D2D cluster.

13. The method according to claim 9, wherein sending, by the base station, the communication signal resource and the timing information of the communication signal resource to the first device such that the first device receives, on the communication signal resource according to the timing information of the communication signal resource, the communication signal sent by the second device comprises sending, by the base station to the first device, indication information of the reference timing signal, the communication signal resource, and the time deviation of timing of the communication signal resource relative to timing of the reference timing signal such that the first device acquires the timing information of the communication signal resource according to the indication information of the reference timing signal and the time deviation of the timing of the communication signal resource relative to the timing of the reference timing signal, and receives, on the communication signal resource using the timing information of the communication signal resource, the communication signal sent by the second device.

14. The method according to claim 13, wherein the reference timing signal is a timing signal of the communication signal resource of the first device.

15. The method according to claim 9, wherein the communication signal resource comprises a first communication signal resource and a second communication signal resource, wherein the timing information of the communication signal resource comprises timing information of the first communication signal resource and timing information of the second communication signal resource, and wherein sending, by the base station, the communication signal resource and the timing information of the communication signal resource to the first device such that the first device receives, on the communication signal resource according to the timing information of the communication signal resource, the communication signal sent by the second device comprises sending, by the base station to the first device, the first communication signal resource, the second communication signal resource, the timing information of the first communication signal resource, and the timing information of the second communication signal resource such that the first device receives the communication signal sent by the second device and sends a communication signal of the first device, on the first communication signal resource according to the timing information of the first communication signal resource, and such that the first device receives, on the second communication signal resource according to the timing information of the second communication signal resource, the communication signal sent by the second device.

16. The method according to claim 9, wherein the D2D communication comprises at least one of D2D discovery and D2D direct communication, wherein the first device is served by only one of the first base station and the second base station, wherein the second device is served by only one of the first base station and the second base station, and wherein a same base station of the first base station and the second base station does not simultaneously serve the first device and the second device.

17. A first device served by a first cell of a communication system, comprising:
 a non-transitory memory for storing computer executable instructions; and
 a processor coupled to the non-transitory memory and configured to execute the computer executable instructions to perform the following operations: acquire a communication signal resource, timing information of the communication signal resource, and a time deviation of timing of the communication resource relative to timing of a reference timing signal, wherein the communication signal resource is used for device-to-device (D2D) communication, and wherein the time deviation implements time synchronization and frequency synchronization between user devices for D2D communication such that users at different cells are able to use the D2D communication; and receive on the communication signal resource according to the timing information of the communication signal resource, a communication signal sent by a second device served by a second cell of the communication system.

18. The first device according to claim 17, wherein when acquiring timing information of the communication signal resource, the processor is further configured to execute the computer executable instructions to perform the following operations:
 acquire a timing signal of the communication signal resource; and
 determine the timing information of the communication signal resource according to the timing signal of the communication signal resource.

19. The first device according to claim 17, wherein when acquiring a timing signal of the communication signal resource, the processor is further configured to execute the computer executable instructions to perform the following operations:
 acquire indication information of the timing signal of the communication signal resource; and
 acquire the timing signal of the communication signal resource according to the indication information of the timing signal of the communication signal resource, wherein the first device is served by only one of the first base station and the second base station, wherein the second device is served by only one of the first base station and the second base station, and wherein a same base station of the first base station and the second base station does not simultaneously serve the first device and the second device.

20. The first device according to claim 17, wherein when acquiring, by the first device, timing information of the communication signal resource, the processor is further configured to execute the computer executable instructions to perform the following operations:
 acquire indication information of the reference timing signal, and the time deviation of timing of the communication signal resource relative to timing of the reference timing signal;
 acquire the reference timing signal according to the indication information of the reference timing signal;
 determine timing information of the reference timing signal according to the reference timing signal; and
 acquire the timing information of the communication signal resource according to the timing information of the reference timing signal and the time deviation of the timing of the communication signal resource relative to the timing of the reference timing signal.

* * * * *